United States Patent [19]
Fukuda et al.

[11] Patent Number: 5,747,762
[45] Date of Patent: May 5, 1998

[54] OSCILLATION SWITCH AND A PORTABLE ELECTRICALLY DRIVING MACHINE WITH THE OSCILLATION SWITCH

[75] Inventors: Kenji Fukuda; Osamu Asano, both of Tokyo, Japan

[73] Assignee: Nitto Kohki Co., Ltd., Tokyo, Japan

[21] Appl. No.: 737,676

[22] PCT Filed: Dec. 27, 1994

[86] PCT No.: PCT/JP94/02226

§ 371 Date: Nov. 21, 1996

§ 102(e) Date: Nov. 21, 1996

[87] PCT Pub. No.: WO95/32514

PCT Pub. Date: Nov. 30, 1995

[30] Foreign Application Priority Data

May 24, 1994 [JP] Japan ............................. 6-109431

[51] Int. Cl.[6] ................................................ H01H 35/02
[52] U.S. Cl. ................................ 200/61.45 R; 200/61.52
[58] Field of Search .................... 200/61.45 R–61.45 M;
307/10.1; 340/566, 573, 686, 687, 689,
693; 73/514.01, 514.15, 514.29

[56] References Cited

U.S. PATENT DOCUMENTS

| | | | |
|---|---|---|---|
| 3,531,605 | 9/1970 | Schrichte | 200/61.45 |
| 4,348,562 | 9/1982 | Florin | 200/52 R |
| 4,628,160 | 12/1986 | Canevari | 200/61.45 R |
| 4,733,324 | 3/1988 | George | 361/118 |
| 5,034,620 | 7/1991 | Cameron | 307/10.7 |
| 5,035,547 | 7/1991 | Shoji | 408/6 |
| 5,153,566 | 10/1992 | Yun | 340/689 |
| 5,285,033 | 2/1994 | Ipcinski | 200/62.52 |
| 5,610,590 | 3/1997 | Johnson et al. | 340/573 |

FOREIGN PATENT DOCUMENTS

| | | | |
|---|---|---|---|
| U48-7765 | 1/1973 | Japan . | |
| A50-145869 | 11/1975 | Japan | H01H 35/02 |
| U52-117262 | 9/1977 | Japan | H01H 35/14 |
| 61-131807 | 6/1986 | Japan | B23B 47/18 |
| A3-19708 | 1/1991 | Japan | B23B 45/14 |
| A4-249019 | 9/1992 | Japan | H01H 35/02 |

*Primary Examiner*—Michael L. Gellner
*Assistant Examiner*—Michael A. Friedhofer
*Attorney, Agent, or Firm*—Nixon & Vanderhye

[57] ABSTRACT

An oscillation switch consists of a pair of ring-shaped electrodes each having an inner surface coaxially provided with a projection and spaced apart at a predetermined distance, and balls arranged in a space formed between the electrodes so that the balls engage the projections to electrically connect the electrodes together when oscillation or lateral sliding occur. A portable electrically driven machine provided with the oscillation switch has the oscillation switch provided on a frame and has a structure which stops a tool rotating motor and a feed motor by interrupting the electric power supply to a control unit of the electric tool. The use of the oscillation switch allows the tool rotating motor or the feed motor to stop as soon as lateral sliding or oscillation starts to occur or when the portable electrically driven machine starts to fall down even if the portable electrically driven tool takes any posture.

7 Claims, 6 Drawing Sheets

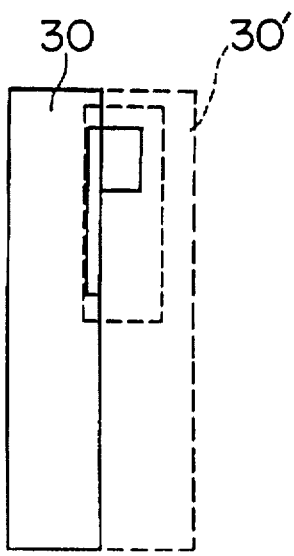
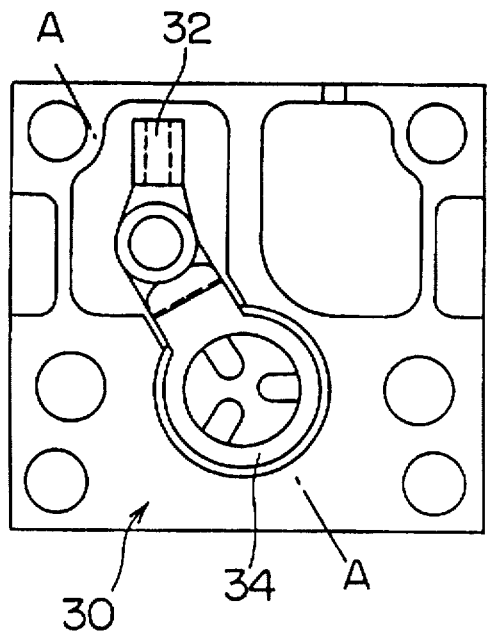
FIG.6A
FIG.6B
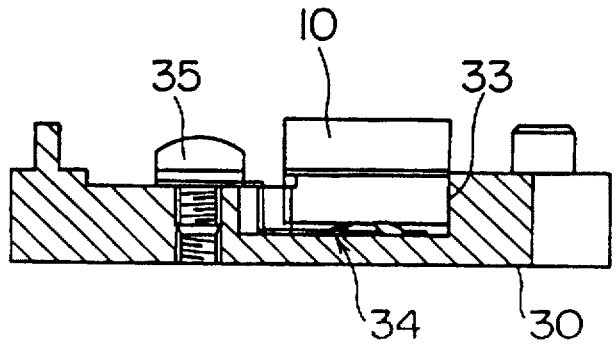
FIG.7
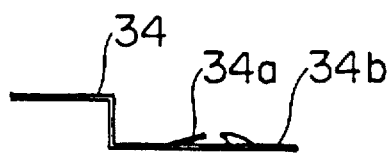
FIG.8A
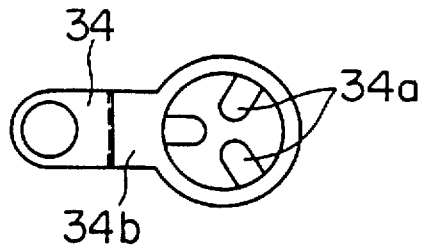
FIG.8B

OSCILLATION SWITCH AND A PORTABLE ELECTRICALLY DRIVING MACHINE WITH THE OSCILLATION SWITCH

FIELD OF THE INVENTION

The present invention relates to an oscillation switch and a portable electrically driven machine which is fixed to a workpiece by means of a clamp or an electromagnet, and more particularly to a highly stable electrically driven machine provided with an oscillation switch which stops the drive of an electrically driven tool fixed to the workpiece by the attraction of an electromagnet base to the workpiece, as soon as the electrically driven tool begins to slide laterally due to cutting resistance or the like which is generated during cutting operation.

BACKGROUND ART

There have been known many portable electrically driven machines which can be fixed to a workpiece by means of a clamp or an electromagnet. Recently, there has been proposed a drilling machine of a portable type which has an automatic feeder and an electromagnet base formed integrally with the drilling machine and which drills a workpiece after the workpiece is attracted to the workpiece so that the drilling machine is fixed to the workpiece.

The attracting force of the electromagnet of the drilling machine with the electromagnet base is set to such a value as fully withstands the cutting resistance generated due to the drilling operation or due to the feed load of the drilling machine so that the drilling machine is prevented from displacing during the drilling operation.

However, the following unexpected phenomena may occur:

- an excessive load happens to be exerted on the cutting edge of the drill when a workpiece having a forged surface is drilled;
- a load larger than a predetermined value may be exerted on the drill by a built-up edge when the drilling time has elapsed to some extent from the starting time of drilling; or
- an excessive load happens to be exerted on the spindle of the drill motor or the automatic feeder of the drilling machine when the space between the drill and the workpiece is clogged with chips so as to cause the drill to bite the workpiece.

On such unexpected occasions, the attracting force cannot withstand these loads and there occurs such trouble that the electromagnet base is lifted and/or is moved with respect to the workpiece.

Under these conditions, the drilling machine with the electromagnet base may rotate around a stabilizing thread or the spindle of the drill, fall down or slide laterally without being attached to the workpiece. In these cases, at least the drive of the drilling machine must be stopped instantaneously.

Under these circumstances, the inventors of the present invention proposed a drilling machine provided with an electromagnet base (hereinafter referred to as "the proposed machine") which stops the drive of the drilling machine as soon as the machine laterally slides even slightly, as disclosed in Japanese Unexamined Patent Application Publication No. 3-19708.

In the proposed machine are provided such elements as a mercury switch which comprises a tubular member filled with mercury and a pair of contacts which extends horizontally in the tubular member or an oscillation switch comprising a fixed contact and oscillation contacts which is provided in the vicinity of the fixed contact via spring means.

Such a switch used in the drilling machine with the electromagnet base detects the lateral sliding of the machine so as to instantaneously stop the drive of the drill motor and/or a feed motor. Thus, a workpiece can be drilled safely.

However, the directions in which the mercury switch or the oscillation switch is operated are limited. When the drilling machine with the electromagnet base is used in an inclined state in such a case in which the drilling machine with the electrode is attached to the inclined surface of the workpiece, the switch which is provided in parallel with the attracted surface of the electromagnet base may fail to operate or the switch may be maintained in an ON state so that the switch cannot perform its own function even if the machine slides laterally. In order to avoid this failure, the machine is attached to the workpiece in such a way that the switch is kept in a horizontal state, or alternately the direction of the switch must be changed with respect to the machine.

The first object of the present invention is to provide an oscillation switch which can securely detect oscillation or sudden swing when the switch is set not only in a horizontal and/or vertical state but also in an inclined state, and particularly an oscillation switch can securely detect the oscillation or sudden swing in any direction such as sudden lateral swing of a portable electrically driven machine.

The second object of the present invention is to provide an electrically driven machine provided with an electromagnet base, which machine is provided at at least one predetermined location thereof with an oscillation switch of the first object and is adapted to securely stop a tool driving motor and/or a feed motor when the machine slides laterally.

DISCLOSURE OF THE INVENTION

The oscillation switch constituting the solving means according to the first object comprises an annular member electrically insulated at least both end portions thereof, a pair of disc-shaped electrodes provided on both the end portions of said annular member and having opposed inner surfaces separated from each other at a distance and defining a space therebetween, each of the inner surface having a central portion, a projection formed on the central portion of the inner surface of at least one of the disc-shaped electrodes, the distance being minimum substantially between the central portions of the inner surfaces of the electrodes, the inner surface of the other electrode being not depressed, and a plurality of balls made of an electrically conducting material and disposed in the space, each of the balls having a diameter larger than the distance which is minimum and smaller than a distance between opposed portions of the disc-shaped electrodes with which the projection is not provided.

The portable electrically driven machine constituting the solving means according to the second object comprises a frame, fixing means for fixing the frame to a workpiece and provided on the frame, an electrically driving tool provided on the frame, at least one oscillation switch constituting the solving means according to the first object, and electric power supply stopping means for stopping the electric power supply to the electrically driving tool during the machining operation when a ball in the switch engages a projection in the switch.

The oscillation switch provided in the frame of the portable electrically driven machine according to the present invention is normally in an OFF state. When, however, the attracting force of the electromagnet base cannot withstand the external force by any cause such as a cause produced by a cutting resistance exceeding its allowed value, the portable electrically driven machine starts to slide laterally. Even if the oscillation is very small, the ball in the oscillation switch is moved toward the projection due to the oscillation. Both electrodes are electrically connected together through the ball and the projection, and the electrical power supply to the driven circuit of the portable electrically driven machine is interrupted by a relay so as to stop the operation of the feed motor. Thereafter, the stopping condition is continued by the relay until the relay is released by a starting switch even if the oscillation switch is in an OFF state.

The oscillation switch according to the present invention has an advantage in that oscillation in any direction can be detected regardless of the mounted position of the oscillation switch. When the lateral sliding occurs even if the machine is used at any mounted angle, the use of the switch in the portable electrically driven machine allows the driving motor and the feed motor to stop securely without adjusting the position of the oscillation switch. Thus, the present invention advantageously provides an extremely highly stable and convenient portable electrically driving machine.

BRIEF DESCRIPTION OF THE DRAWINGS

FIG. 6A is a side view of one embodiment of a casing in which the oscillation switch according to the present invention is housed;

FIG. 6B is a plan view of the casing of FIG. 6A;

FIG. 7 is a cross sectional view taken along line A—A in FIG. 6B;

FIG. 8A is a side view of one embodiment of a holding spring provided in one of the casings of FIGS. 6A, 6B and 7;

FIG. 8B is a plan view of the holding spring of FIG. 8;

THE BEST MODES FOR MACHINING THE PRESENT INVENTION

The present invention will be described by way of an embodiment of a portable drilling machine which is used as an electrically driven machine and embodiments of oscillation switches, with reference to the accompanying drawings.

Figure 1:
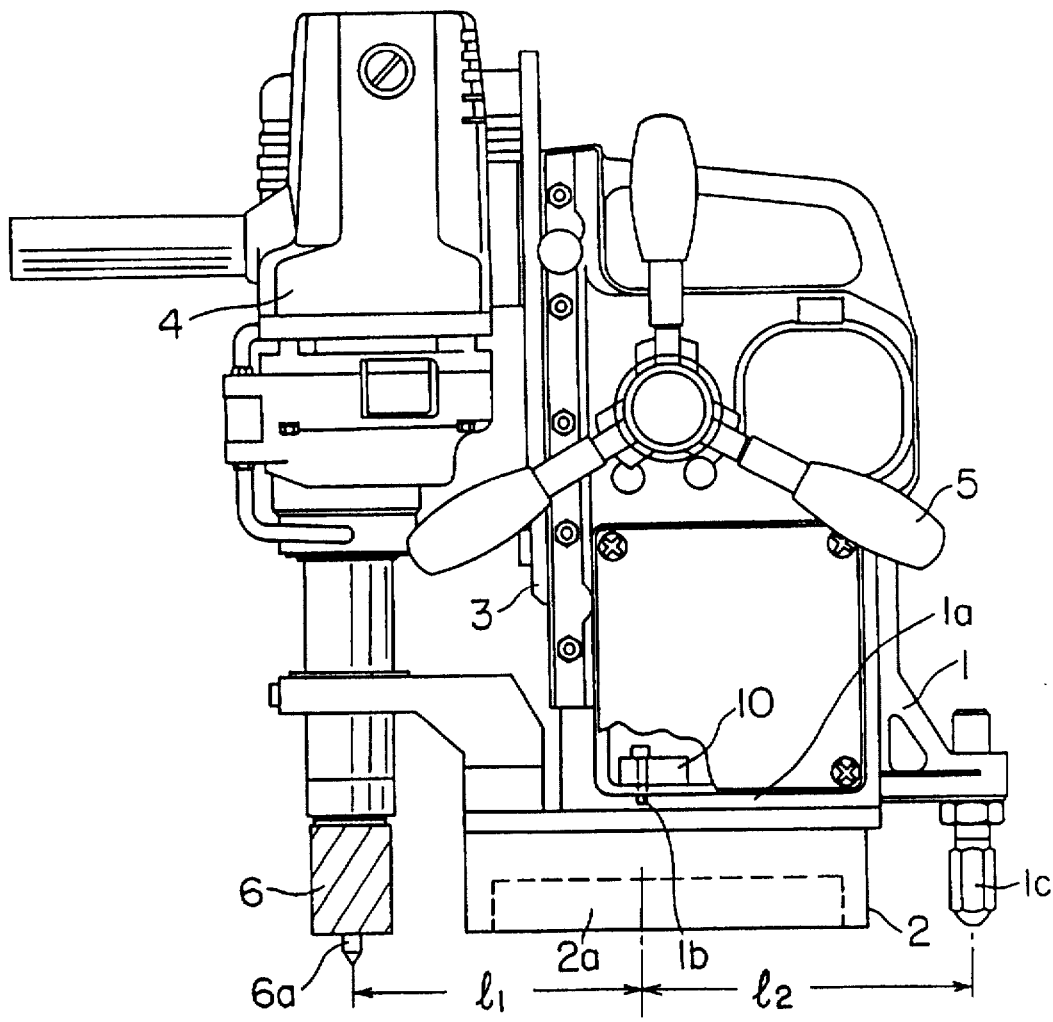
FIG. 1 is a front view of a first embodiment of a drilling machine provided with an electromagnet base according to the present invention.
Figure 2:
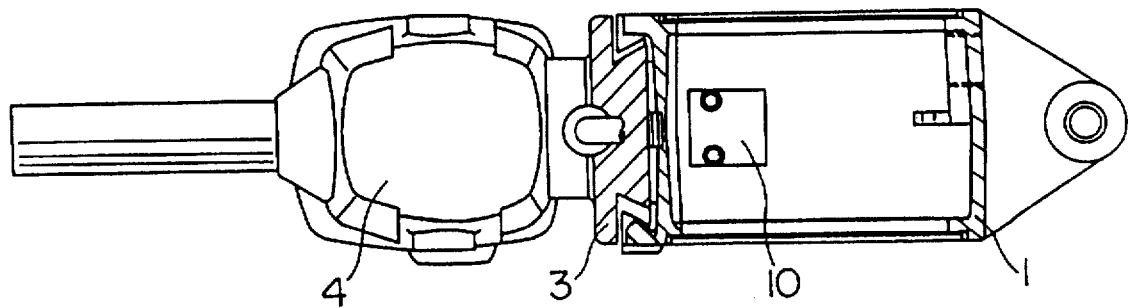
FIG. 2 is a plan view of the machine of FIG. 1.
Figure 11:
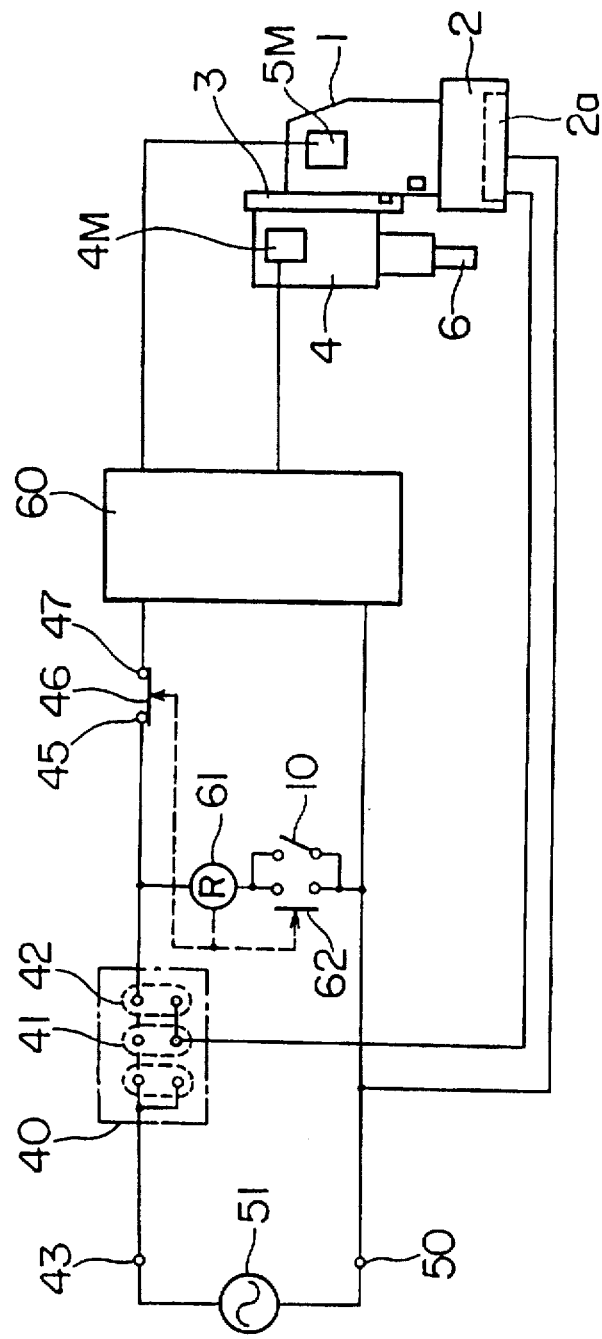
FIG. 11 is a block diagram of one embodiment of the control circuit of the drilling machine with the electromagnet base according to the present invention.

As shown in FIGS. 1, 2 and 11, an electromagnet base 2 is mounted on a frame 1 of the driven machine which has an electromagnet base. A vertically movable slide plate 3 is provided on the front face of the frame 1. An electric drill 4 as an electric tool is fixed to the slide plate 3. The slide plate 3 is connected to a feed motor and a lifting/lowering handle 5 for moving the electric drill 4 vertically via a gear mechanism (not shown) in the frame 1. The electric drill 4 can be manually lifted or lowered by operating the lifting/lowering handle 5, and the electric drill 4 can be automatically moved upward or downward by driving the feed motor. An annular cutter 6 is provided in an arbor of the electric drill 4.

As the slide plate 3 is lowered by the feed motor, the electric drill 4 is also lowered so as to drill a workpiece. When the cutting edge of the annular cutter 6 arrives at a predetermined lower position after the drilling operation has been completed, a limit switch (not shown) is operated, and the automatic feed and rotation of the electric drill 4 are stopped.

At least one non-directional oscillation switch 10 whose mounting directions are not limited (as will be descried later) is provided at a predetermined position in the frame 1 of the drilling machine with the electromagnet base (as will also be described later). Even if any lateral sliding occurs in any direction in the machine during its operation, the oscillation switch 10 detects the lateral sliding without fail and stops the drill motor and the feed motor securely. An operation circuit (which will be described later) of the drilling machine with the electromagnet base is housed in the frame 1.

The mechanism of the drilling machine with the electromagnet base is the same as that of a conventional drilling machine with an electromagnet base, the description thereof being omitted. The drilling machine with the electromagnet base which is an embodiment of the present invention is of a type in which the drilling unit can be mounted on a workpiece by the attracting force of an electromagnet. However, the present invention is applicable to any electrically driven machines which can be attached to a workpiece by means of a mechanical clamp in place of the electromagnet.

The structure of the oscillation switch 10 will be described with reference to FIGS. 3 to 8. As will be described later, the oscillation switch 10 has a structure which sets contacts in an ON state when shock or oscillation occurs in any direction. When, therefore, the oscillation switch is mounted on the electrically driven machine at any position or when the electrically driven machine is used at any position, shock or oscillation produced in the electrically driven machine is detected and the oscillation switch sets the contacts in an ON state.

Figure 3:
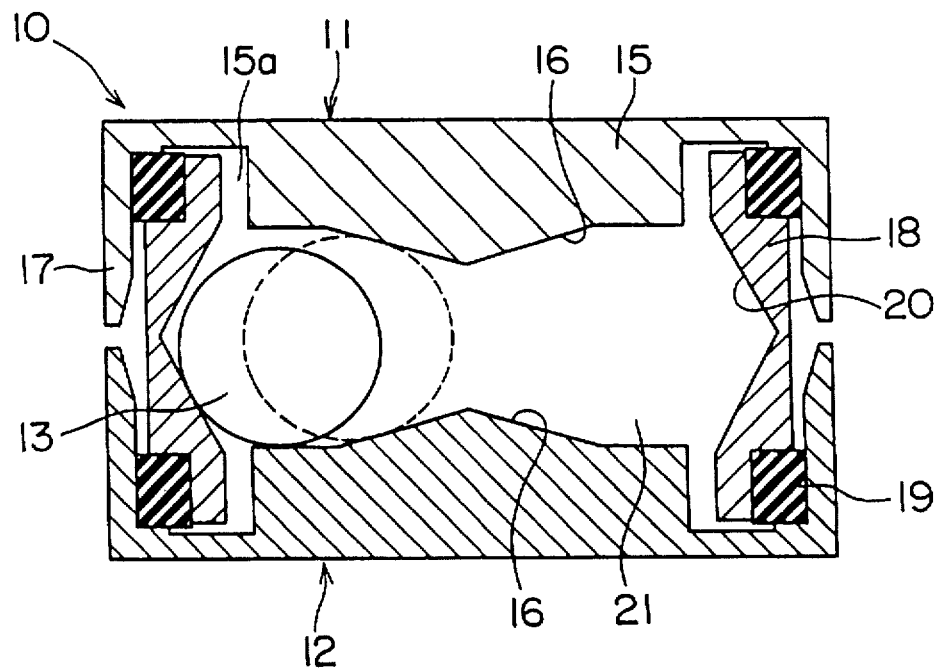
FIG. 3 is a longitudinal cross sectional view of the first embodiment of the oscillation switch according to the present invention.
Figure 4:
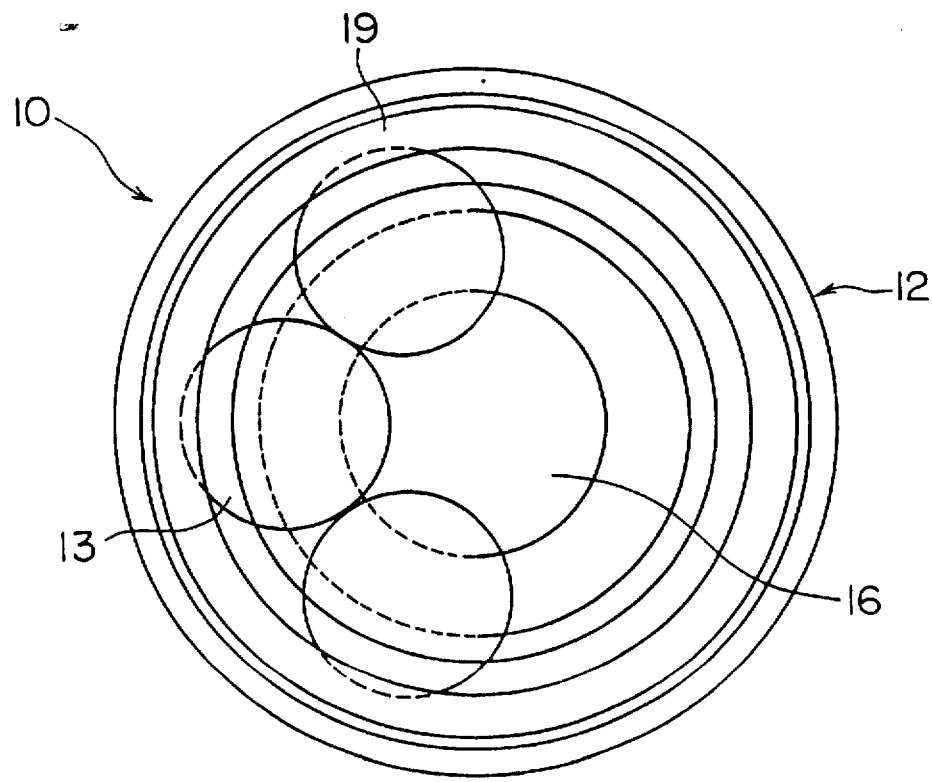
FIG. 4 is a plan view of the oscillation switch of FIG. 3, with the upper electrode detached.

As shown in FIGS. 3 and 4, the oscillation switch 10 comprises a first electrode 11 and a second electrode 12 both having the same disc shape and disposed opposite to each other, an annular member 18 having both ends in which the first electrode 11 and the second electrode 12 are fitted in an electrically insulated state so that both electrodes define a space 21 between the inner faces of the body portions 15 of the first electrode 11 and the second electrode 12, and a plurality (three in this embodiment) of balls 13 arranged so as to be movable radially in the space 21. Although three balls 13 are used in this embodiment, the number of the balls can be changed according to the size, sensitivity and/or the like of the oscillation switch 10. The diameter of the ball 13 is smaller than the dimension of the outer peripheral portion of the space 21 and is larger than the distance between the centers of projections, as will be described later.

Conical projections 16 are provided on the central portions of the inner surfaces of the opposed body portions 15 of the first electrode 11 and the second electrode 12 so as to project coaxially toward the opposed body portions 15 of the electrodes. The outer peripheral surface of each body portion 15 forms an outer peripheral wall 17 having an L-shaped longitudinal cross section so that an annular groove 15a is defined between the outer peripheral wall 17 and the body portion 15. The outer peripheral wall 17 is mounted on the respective end portion of the annular member 18 through an annular electrically packing 19 fitted on the respective end portion of the annular member 18, whereby the centers of the conical projections 16 of both electrodes 11 and 12 are aligned coaxially with each other. If necessary, a shallow V-shaped groove 20 for receiving the balls 13 well may be formed in the central portion of the inner peripheral surface of the annular member 19.

The first and second electrodes 11 and 12 are made of an electrically conducting material. However, for example, each electrode may be a disc-like member made of a plastic material coated with an electrically conducting film, so as to reduce its weight. Alternatively, the electrode may be made from a metal sheet press-formed into a disc shape.

The core of each of the balls 13 may be made of the same material as that of the electrodes 11 and 12. It is necessary, however, that the balls be made of a material which provides such a large weight as allows for detection of oscillation and they be formed on the outer surface with an electrically conducting layer (preferably a gold film). In the drilling machine which uses an electromagnet base (a drilling machine with an electromagnet base), it is effective that the balls 13 are made of stainless steel so as not to be influenced by the electromagnetism of the electromagnet base. In the electrically driven machine using a mechanical clamp, however, the material of the balls is not limited.

As long as the annular member 18 holds the first electrode 11, the second electrode 12 and the balls 13, their material is not limited. However, a relatively hard material must be used for the electrically insulating packings 19. When the oscillation switch 10 is housed in a casing as will be described later, the electrodes 11 and 12 are pressed by a spring as will also be described later. If, therefore, the material of the electrically insulating packing 19 is too soft, the packing 19 is deformed by the urging force of the spring with the result that the distance between the first and second electrodes 11 and 12 is reduced so as to disadvantageously cause the first and second electrodes to contact each other thereby to be electrically connected to each other.

The annular member 18 may be made of an electrically insulating material. In this case, the electrically insulating packing 19 is unnecessary. When the first and second electrodes 11 and 12 are connected together, for example, merely by the electrically insulating packing 19 with a predetermined space left between the electrodes, the annular member 18 may not be used.

While the so constructed oscillation switch 10 is in a stationary state, the balls 13 are separated from both or either one of the first and second electrodes 11 and 12 so as to be in an OFF state, regardless of the mounted position. When the oscillation switch 10 takes a horizontal posture or inclines at a small angle, i.e., in a stationary state, the balls 13 ride on the outer peripheral portion of the inner surface of the lower electrode 12 and on the lower face portion of the groove 13 in the annular member 18 as shown by a solid line in FIG. 3, and the balls 13 are separated from the upper electrode 11. While the oscillation switch 10 is set at 90° or inclined at an angle close thereto, i.e., in another stationary state, the balls 13 ride on the groove 18 and are separated from both electrodes 11 and 12. When, on the other hand, oscillation or acceleration is applied to the oscillation switch 10, the balls 13 are moved radially inward of the oscillation switch 10 and contact the conical projections 16 of both electrodes 11 and 12 as shown by a dotted line in the figure, whereby both electrodes 11 and 12 are electrically connected to each other and an OFF state is obtained, regardless of the position of the switch.

FIGS. 5A to 5D each show another embodiment of the oscillation switch according to the present invention.

Figure 5A:
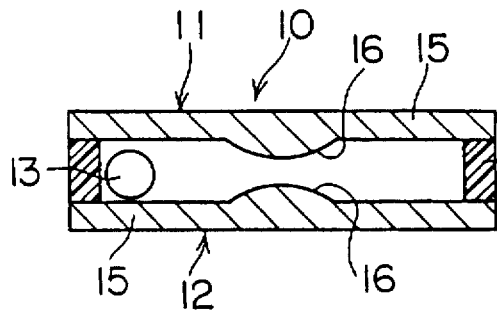
FIGS. 5A to 5D are, respectively, longitudinal cross sectional views of other embodiments of the oscillation switch according to the present invention.
Figure 5B:
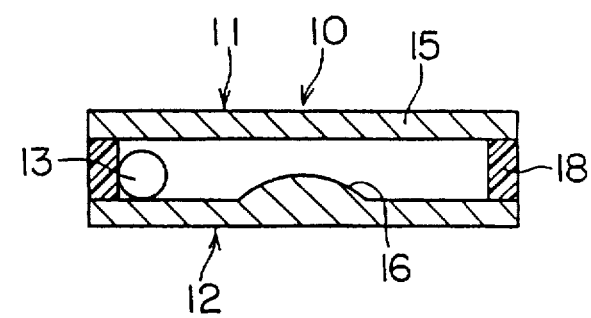
Figure 5C:
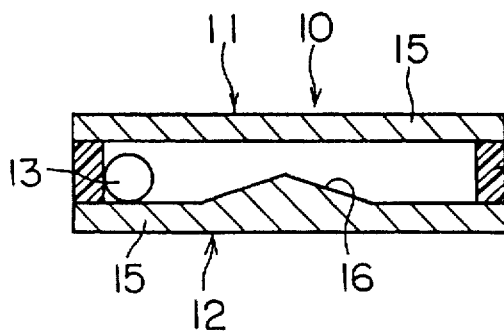
Figure 5D:
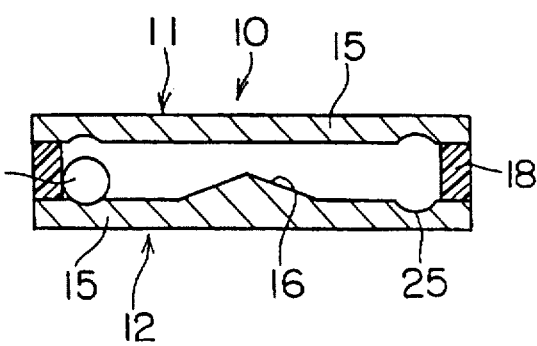

In the oscillation switch 10 as shown in FIG. 5A, a spherically segmental or hemispherical projection 16 is formed on the central portion of the inner surface of each of the body portions 15 of the first and second electrodes 11 and 12. In the oscillation switch 10 as shown in FIG. 5B, a spherical segmental or hemispherical projection 16 is formed merely on the central portion of the body portion 15 of the second electrode 16. Further, in the oscillation switch 10 as shown in FIG. 5C, a conical projection 16 is formed merely on the central portion of the body portion 15 of the second electrode 12. Still further, the oscillation switch 10 as shown in FIG. 5D has the same structure as that of the oscillation switch 10 as shown in FIG. 5C. In addition, an annular groove 25 having a segmental shape in cross-section is formed in the outer peripheral portion of the inner surface of the body portion 15 of each of the first and second electrodes 11 and 12. Each annular groove 25 has such a depth that the balls 13 are disengaged therefrom when the oscillation to be detected is applied to the oscillation switch 10. The oscillation sensitivity of the oscillation switch 10 can be adjusted by changing the depth. The electrodes 11 and 12 including their projections 16 can take various shapes other than the above-mentioned shapes. In the oscillation switches 10 as shown in FIGS. 5A to 5C, the annular member 11 and the first and second electrodes 11 and 12 made of an electrically insulating material are connected together.

The oscillation switch 10 is housed in a casing and attached to an electrically driving machine. As shown in FIGS. 6A, 6B and 7, the casing is formed by injection molding an electrically insulating material such as resin and comprises two split type rectangular parallelepiped portions 30 and 30'. A depression 33 which houses an oscillation switch 10 is formed in each of the portions 30 and 30' (only one portion 30 being shown in FIG. 7 and the portion 30' being similar to the portion 30). A holding spring 34 as shown in FIGS. 8 and 8A is attached by a screw 35 to the mating face of each of the portions 30 and 30' in a state in which its body portion 34b having three spring pawl portions 34a is in contact with the bottom of the respective depression 33. A lead 32 extends from the holding spring 34 and is connected to an operation circuit as will be described later. The two portions 30, 30' and the oscillation switches 10 housed in the depression 33 constitute an oscillation switch assembly.

In the casing may be provided a printed substrate to which the oscillation switches 10 are soldered so that the lead 32 can extend from the predetermined portion of the pattern of the printed circuit. The outer shape of the casing and the method of housing the oscillation switches in the casing are not limited as long as the oscillation switches 10 operate smoothly.

Figure 9:
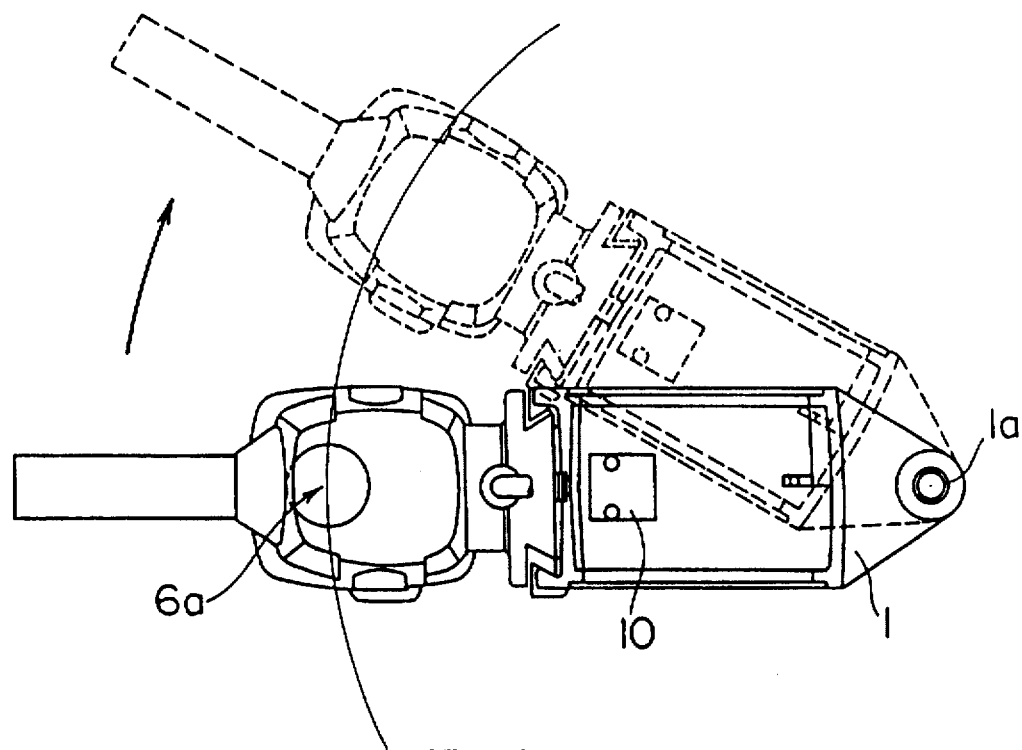
FIG. 9 is a view illustrating how lateral sliding occurs around a safety screw of the drilling machine with the electromagnet base of FIGS. 1 and 2.
Figure 10:
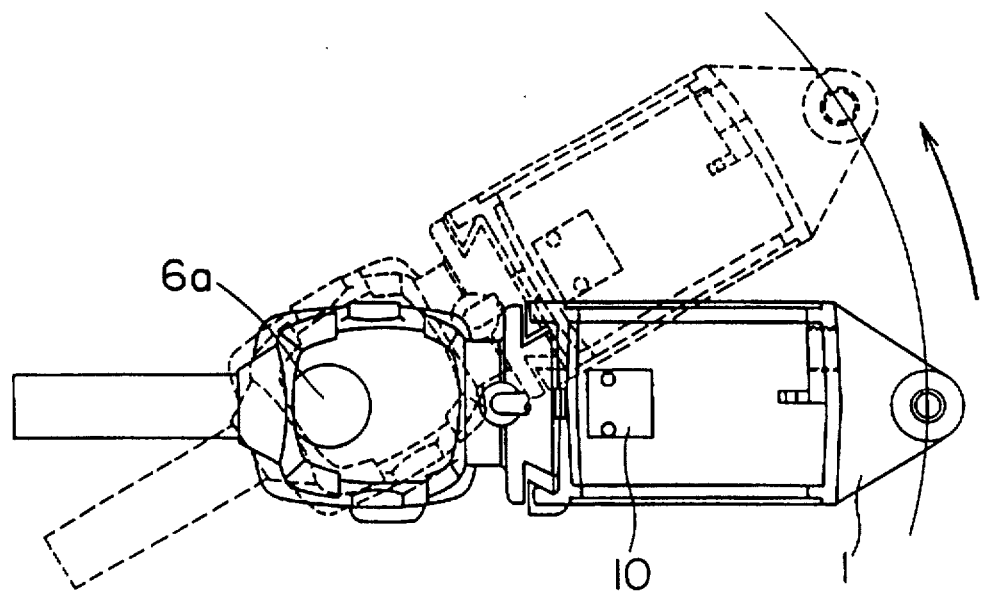
FIG. 10 is a view illustrating how lateral sliding occurs around a cutting tool of the drilling machine with the electromagnet base of FIGS. 1 and 2.

In the present invention, the portable electrically driven machine uses at least one oscillation switch 10 according to the present invention. In the succeeding embodiment, a drilling machine which is a portable electrically driven machine with an electromagnet base will be described as the one being provided with a single oscillation switch 10 with reference to FIGS. 1, 9 and 10.

As shown in FIG. 1, an oscillation switch 10 is fixed to the upper surface of the horizontal lower wall 1a of the frame 1 at the point 1b corresponding to the substantially central point of a line connecting the cutting edge 6a of the drill 6 inserted in the spindle of the electric drill 4 with the lower tip of the stabilizing screw 1a provided on the lower rear end portion of the frame 1 (the position of the substantially central portion being shown as being 11⇌12 as shown in FIG. 1).

The substantially central point 1b is selected by the following reason.

When the annular cutter 6 is applied, during the drilling operation, with such an excessive load which makes it impossible to fix a workpiece to the drilling machine by the attracting force of the electromagnet base 2, two kinds of lateral sliding can be observed.

Upon starting the drilling operation by the annular cutter 6, an overload exerted on the cutting edge of the annular cutter 6 happens to cause the drilling machine to slide laterally on an arcuate locus around the stabilizing screw 1a. In this case, the radius of rotation is shown by 12.

As the drilling operation continues, a built-up edge is likely to be formed on the annular cutter 6. When the built-up edge increases the load applied to the annular edge 6 excessively and when the space between the drilling annular cutter 6 and the hole which is being drilled is clogged with chips so that the annular cutter 6 bites a workpiece, the drilling machine slidably rotates on the workpiece around the spindle of the electric drill 4 or around the cutting edge 6a of the annular cutter 6. In this case, the radius of rotation of the oscillation switch 10 is shown by 11.

It follows that the radii of rotation of the oscillation switch 10 are substantially equal to each other when the above-mentioned two kinds of lateral sliding occur, because the oscillation switch 10 is fixed to the upper surface of the lower wall 1a of the frame 1. Thus, the oscillation switch 10 operates as an oscillation sensor having the substantially same sensitivity for both kinds of the lateral sliding. If, however, the oscillation switch 10 were not located at the substantially central portion 1b, the sensitivities for the two kinds of lateral sliding would differ from each other. The latter arrangement would be undesirable as a safety device because the oscillation switch would not provide substantially same sensitivity for the two kinds of lateral sliding.

Alternatively, an oscillation switch 10 and another oscillation switch 10 may be provided on the portions of the upper surface of the lower wall 1a of the frame 1 which are disposed at the side of the spindle of the electric drill 4 and at the side of the stabilizing screw 1c, respectively. When, however, the drilling machine with the electromagnet base is not provided with the stabilizing screw 1c, the oscillation switch 10 may be provided on the upper surface of the lower wall 1a of the frame 1 at a position separated from the spindle, for example, on the rear end portion.

It is ensured that the balls 13 are disengaged from at least one of the electrodes 11 and 12 in a normal state and are in contact with both electrodes 11 and 12 when oscillation occurs in the following ways. In the case where the projections 16 are formed on the first and second electrodes 11 and 12 as shown in FIGS. 3, 4 and 5A, the oscillation switch 10 may be mounted on the lower wall 1a of the frame 10 with either one of the electrodes 11 and 12 directed toward the electromagnet base 2. In the case where the projection 16 is provided on either one of the electrodes 11 and 12 as shown in FIGS. 5B and 5C, on the other hand, it is desirable that the electrode 12 be fixed onto the lower wall 1a of the frame 1 with the electrode 12 disposed below, provided that the inclination of the oscillation switch 1 is assumed to be in a range between 45° and 90°, except for 90°. It is apparent from the above-mentioned description that the oscillation switch 10 arranged in this way has a feature in that it operates in response to oscillation in any direction.

Next, a control circuit of an embodiment of the drilling machine with an electromagnet base will be described with reference to a block diagram as shown in FIG. 11.

An electric alternating current power source 51 has two terminals 43 and 50. The terminal 43 is connected to an input terminal of a driving circuit 60 through a starting switch 40, and the other terminal 50 is connected to another input terminal of the driving circuit 60 and to a terminal of the electromagnet 2a in the electromagnet base 2.

A relay 61 is connected to the terminal 50 through an "a" contact 62 and also to a contact 45 at the side of the starting switch 40 and a contact 47 at the side of the driving circuit 60 through a "b" contact 46. The oscillation switch 10 is disposed in parallel with the "a" contact 61. When the relay 61 is not operated, the "a" contact 62 is in an OFF state and the "b" contact 46 is in an ON state. The oscillation switch 10 is in an OFF state except in case of restarting. A drill-rotating motor 4M and a feed motor 5M of the electric drill 4 are connected to output terminals of the driving circuit 60, respectively.

The starting switch 40 has contacts 41 and 42. When the starting switch 40 is operated, the contact 41 is closed (this step of operation being hereinafter referred to as "the first operating step"), and the electric alternating current power source 51 and the other terminal of the electromagnet 2a are electrically connected to each other so that electric power is supplied to the electromagnet 2a, at first. Then, the contact 42 is closed in a state in which the contact 41 is closed (this state of operation being hereinafter referred to as "the second operating step") so that electric power is supplied from the power source 51 to the driving circuit 60 through the contact 43 and the "b" contact 46.

The driving circuit 60 is well known, for example, from Japanese Unexamined Patent Application Publications Nos. 3-19708 and 61-131807, the detailed description thereof being omitted.

The operation of the drilling machine with the electromagnet base will be described.

When the starting switch 40 is operated in the first operating state, the contact 41 is closed and electric power is supplied from the power source 51 to the electromagnet 2a to excite it as already described, whereby the drilling machine with the electromagnet base is fixed to the workpiece.

Next, in the second operating state, the contact 42 is closed in a state in which the electromagnet 2a is excited with the contact 41 kept closed, as described already. Electric power is supplied from the power source 51 to the driving circuit 60, and the rotation motor 4M of the electric drill 4 is rotated by the driving circuit 60.

Then, when the electric drill 4 is lowered to a predetermined position by operating the handle 5, a clutch (not shown), for example, is actuated. The feed motor 5M of the electric drill 4 is rotated by the driving circuit 60 and the electric drill 4 is automatically fed. After the workpiece has been drilled by the annular cutter 6 provided on the electric drill 4. the limit switch is actuated so as to stop the automatic feed and rotation of the electric drill 4. Finally, the rotation of the feed motor 5M is reversed by the driving circuit 40. The electric drill 4 is returned to the original position and the rotation of the feed motor 5M is stopped.

When the drilling machine with the electromagnet base slides laterally at the beginning of the drilling operation or during the drilling operation or when the drilling machine tends to fall, the balls 13 are moved radially inward in the oscillation switch 10 and abut against the first and second electrodes 11 and 12, thereby electrically connecting together the first and the second electrodes 11 and 12. This electrical conduction allows the oscillation switch 10 to take an ON state, the relay 61 to be operated and the "b" contact 46 to take an OFF state. The rotation motor 4M and the feed motor 5M are stopped. Thus, the drilling machine with the electromagnet base is previously prevented from sliding laterally or falling.

As soon as the "b" contact 46 takes the OFF state, the "a" contact is set in an ON state. Thereafter, the "b" contact 46 is kept in the OFF state, and thus, both rotation motor 4M and the feed motor 5M are prevented from rotating. In order to set the "b" contact 46 to be in ON state, the oscillation switch 10 is returned to an OFF state.

The present invention is not limited to the above-mentioned embodiments but is applicable to various modifications as long as they fall in the technical scope of the present invention. For example, the electrodes of the oscillation switch and the balls may be made of various materials including molding material as long as their object is achieved. The portable electrically operating machine is not only of a type having an electromagnet base but also may be of a type having a mechanical clamp for attaching an electrically driven tool to a workpiece.

INDUSTRIAL APPLICABILITY

Since the oscillation switch according to the present invention can securely detect lateral sliding or oscillation regardless of the setting angle of the oscillation switch, the oscillation switch can be used on or in all machines, devices and the other articles. In particular, the oscillation switch is suited to be used as an apparatus for preventing a portable electrically driven machine from sliding laterally or falling during machining operation.

Further, the portable electrically driven machine is used as a machine having an extremely high stability because lateral sliding or falling is prevented during the machining operation.

We claim:

1. An oscillation switch comprising an annular member electrically insulated at at least both end portions thereof, a pair of disc-shaped electrodes provided on said both end portions of said annular member and having opposed inner surfaces separated from each other at a distance and defining a space therebetween, each of said inner surfaces having a central portion, a projection formed on said central portion of said inner surface of at least one of said disc-shaped electrodes, said distance being a minimum substantially between said central portions of said inner surfaces of said electrodes, said inner surface of the other electrode being undepressed, and a plurality of balls made of an electrically conducting material and disposed in said space, each of said balls having a diameter larger than said minimum distance and smaller than a distance between opposed portions of said disc-shaped electrodes with which said projection is not provided.

2. The oscillation switch according to claim 1, wherein said projection is conical.

3. The oscillation switch according to claim 1, wherein said projection is segmental in cross section.

4. The oscillation switch according to claim 1, wherein said annular V-shaped member has inner peripheral surface in which an annular groove for receiving said balls is formed.

5. The oscillation switch according to claim 1, wherein an annular groove for receiving said balls is formed in an outer peripheral portion of each of said electrodes, said annular grooves being arranged to face each other.

6. A portable electrically driven machine including a frame, fixing means provided on said frame for fixing said frame to a workpiece, an electrically driven tool fixed to said frame and a control circuit for controlling operation of said electrically driven tool, said portable electrically driven machine further comprising at least one oscillation switch as defined by claim 1 and provided on said frame, an electric power supply stopping means for stopping electric power supply to said electrically driven tool during machining operation in response to actuation of said oscillation switch when at least one of said balls in said oscillation switch engages said projection formed in said oscillation switch.

7. The portable electrically driving machine according to claim 6, wherein said portable electrically driving machine is a drilling machine with an electromagnet base.

* * * * *